(12) United States Patent
Few (10) Patent No.: US 11,613,149 B2
(45) Date of Patent: Mar. 28, 2023

(54) MONOBAR HITCH SYSTEM

(71) Applicant: Lippert Components Manufacturing, Inc., Elkhart, IN (US)

(72) Inventor: Jeffrey P. Few, Elkhart, IN (US)

(73) Assignee: LIPPERT COMPONENTS MANUFACTURING, INC., Elkhart, IN (US)

( * ) Notice: Subject to any disclaimer, the term of this patent is extended or adjusted under 35 U.S.C. 154(b) by 136 days.

(21) Appl. No.: 17/066,632

(22) Filed: Oct. 9, 2020

(65) Prior Publication Data

US 2022/0111691 A1    Apr. 14, 2022

(51) Int. Cl.
| | | |
|---|---|---|
| *B60D 1/167* | (2006.01) | |
| *B60D 1/50* | (2006.01) | |
| *B60D 1/24* | (2006.01) | |
| *B60D 1/54* | (2006.01) | |

(52) U.S. Cl.
CPC ........... *B60D 1/1675* (2013.01); *B60D 1/247* (2013.01); *B60D 1/50* (2013.01); *B60D 1/54* (2013.01)

(58) Field of Classification Search
CPC ........ B60D 1/1675; B60D 1/247; B60D 1/50; B60D 1/54; B60D 1/167; B60D 1/14; B60D 1/00; B60D 1/24
See application file for complete search history.

(56) References Cited

U.S. PATENT DOCUMENTS

| | | |
|---|---|---|
| 4,815,752 A | 3/1989 | Young et al. |
| 5,375,867 A | 12/1994 | Kass et al. |
| 5,465,991 A | 11/1995 | Kass et al. |
| 5,628,525 A | 5/1997 | Kass et al. |
| 5,799,965 A | 9/1998 | Kass et al. |
| 5,868,414 A | 2/1999 | McCoy et al. |
| 6,045,147 A | 4/2000 | Schmidt et al. |
| 6,860,501 B2 | 3/2005 | Schmidt et al. |
| 7,506,885 B2 | 3/2009 | Colibert et al. |
| 7,600,773 B2 | 10/2009 | Stettler |
| 7,967,320 B2 | 6/2011 | Anderson et al. |
| 7,967,322 B1 | 6/2011 | Rowland et al. |
| 7,976,050 B1 | 7/2011 | Goodman et al. |
| 7,976,053 B2 | 7/2011 | Stettler |
| RE44,948 E | 6/2014 | Goodman et al. |
| 9,624,029 B2 | 4/2017 | Nehring |
| 10,005,332 B2 | 6/2018 | Nehring |
| 10,099,526 B2 | 10/2018 | Olson et al. |
| 10,300,751 B2 | 5/2019 | Nehring |
| 10,899,403 B2 | 1/2021 | Bussell |

(Continued)

*Primary Examiner* — Jacob B Meyer
*Assistant Examiner* — Abigail R Hymel
(74) *Attorney, Agent, or Firm* — Nixon & Vanderhye P.C.

(57) ABSTRACT

A hitch system for distributing weight from a trailer to the wheels of a towing vehicle. The system has a hitch head that is pivotally connected to a hitch bar and is pivotable about a hitch head axis with respect to the hitch bar. A hitch pin is rotatably fixed to the hitch head and the hitch pin is rotatable with respect to the hitch head about a hitch pin axis. The hitch pin axis is transverse to the hitch head axis. A single spring is pivotally connected to the hitch head and is pivotable with respect to the hitch head about a spring axis. A distal end of the spring spaced from the spring axis is connectable to the trailer when the trailer is connected to the hitch pin and the spring can provide a biasing force when the distal end of the spring is moved nearer the trailer.

15 Claims, 9 Drawing Sheets

(56) References Cited

U.S. PATENT DOCUMENTS

| | | | | |
|---|---|---|---|---|
| 11,247,518 B1* | 2/2022 | Works | ................ | B60D 1/247 |
| 11,267,301 B2 | 3/2022 | McAllister et al. | | |
| 2002/0190498 A1* | 12/2002 | Schmidt | ................ | B60D 1/065 |
| | | | | 280/455.1 |
| 2014/0265240 A1* | 9/2014 | McCoy | ................ | B60D 1/247 |
| | | | | 280/405.1 |

* cited by examiner

MONOBAR HITCH SYSTEM

BACKGROUND OF THE INVENTION

Hitch assemblies for evenly distributing the tongue weight of a trailer over the front and rear wheels of a towing vehicle have been made for quite some time. Traditionally, this has involved a hitch ball that connected to the coupler on the trailer tongue. This joint of a coupler to a hitch ball on the towing vehicle provided a fully gimballed joint. This joint allowed for roll of the trailer with respect to the towing vehicle as it both traversed over rough terrain. A hitch head of such an assembly had two apertures for receiving two spring bars as shown in U.S. Pat. No. 5,375,867 for example. The spring bars extend from the hitch head toward the trailer in a cantilevered fashion and straddle opposite sides of a trailer tongue which may be an A-frame configuration. Once the spring bars are installed into the hitch head, they must be coupled to the trailer. This can be done by using the trailer jack to lift the trailer tongue and towing vehicle via the hitch ball and coupler connection so the spring bars can be coupled to the trailer in their unbiased, free condition. This is a workable way to couple the spring bars to the trailer only if the jack can lift the trailer high enough. In cases where the jack cannot accomplish this, lever bars can be used to muscle the spring bars into a biased connection with the trailer. Coupling the spring bars to the trailer can be done by a combination of the lifting the trailer tongue and using the lever to muscle the spring bars into place. This procedure takes a certain amount of strength and may involve some risk if one of the spring bars were to break loose from the trailer and strike the user of the system before the spring bar is fully secured.

The secured connection of the spring bar to the trailer can be through chains hooked to the trailer or L-brackets that are connected to the trailer. Either connection transmits varying forces through the trailer depending on the road conditions over which the trailer and towing vehicle travel. For instance, if the trailer rolls with respect to the towing vehicle due to terrain, the towing vehicle will twist with respect to the trailer tongue and this will bend the spring bars at different rates. The uneven loading on the trailer tongue by the different forces coming from different bars will impart stresses on the trailer.

The pivot axis of the spring bars being offset from the center of the hitch ball will also impart stresses on the trailer. The center of the hitch ball forms the pivot axis between the trailer and towing vehicle. Because the spring bars are offset from the center of the hitch ball, the spring bars will effectively become longer and shorter as the towing vehicle turns. This shifting of the spring bars relative to the trailer tongue will be resisted through the bracket or chain connection to the tongue.

There is unmet need to have a weight distribution system that addresses the problems listed above.

SUMMARY OF THE INVENTION

The hitch system of the present invention is for distributing the force from a trailer to the wheels of a towing vehicle. The system has a hitch head that is pivotally connected to a hitch bar and is pivotable about a hitch head axis with respect to the hitch bar. A hitch pin is rotatably fixed to the hitch head and the hitch pin is rotatable with respect to the hitch head about a hitch pin axis. The hitch pin axis is transverse to the hitch head axis. A single spring is pivotally connected to the hitch head and is pivotable with respect to the hitch head about a spring axis. The spring is connectable to the trailer when the trailer is connected to the hitch pin and the spring can provide a biasing force when a distal end of the spring that is spaced from the spring axis is moved from a first position relatively far from the trailer into a second position locating the spring nearer the trailer.

The system may also have the spring axis being coaxial with the hitch pin axis.

The system may further comprise a jack that has an extended and retracted position that may move distal end of the spring from the first position into the second position as the jack moves from an extended position into a retracted position.

DETAILED DESCRIPTION OF INVENTION

Figure 1:
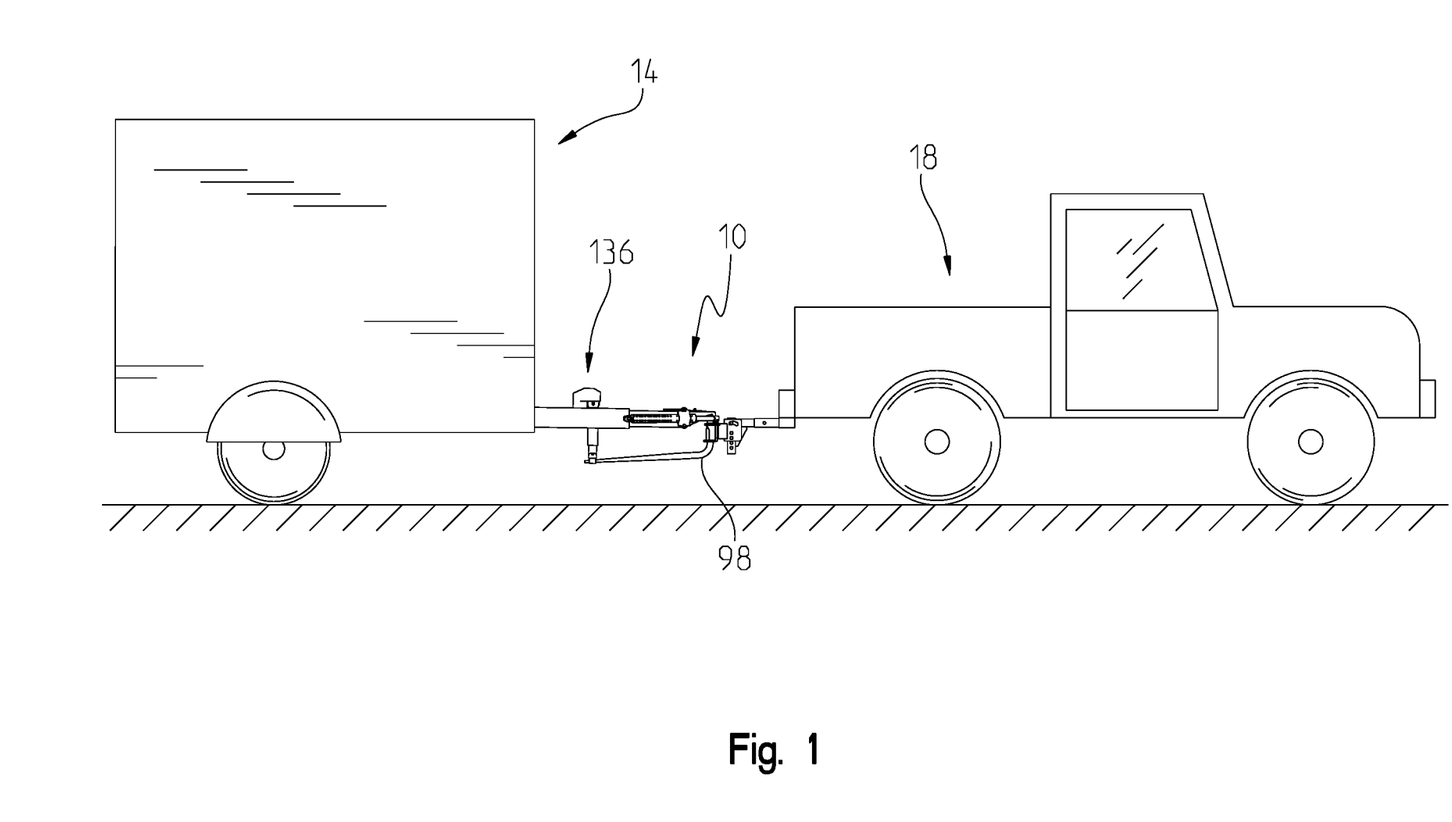
FIG. 1 shows the system of the invention connected to a towing vehicle and a trailer.
Figure 2:
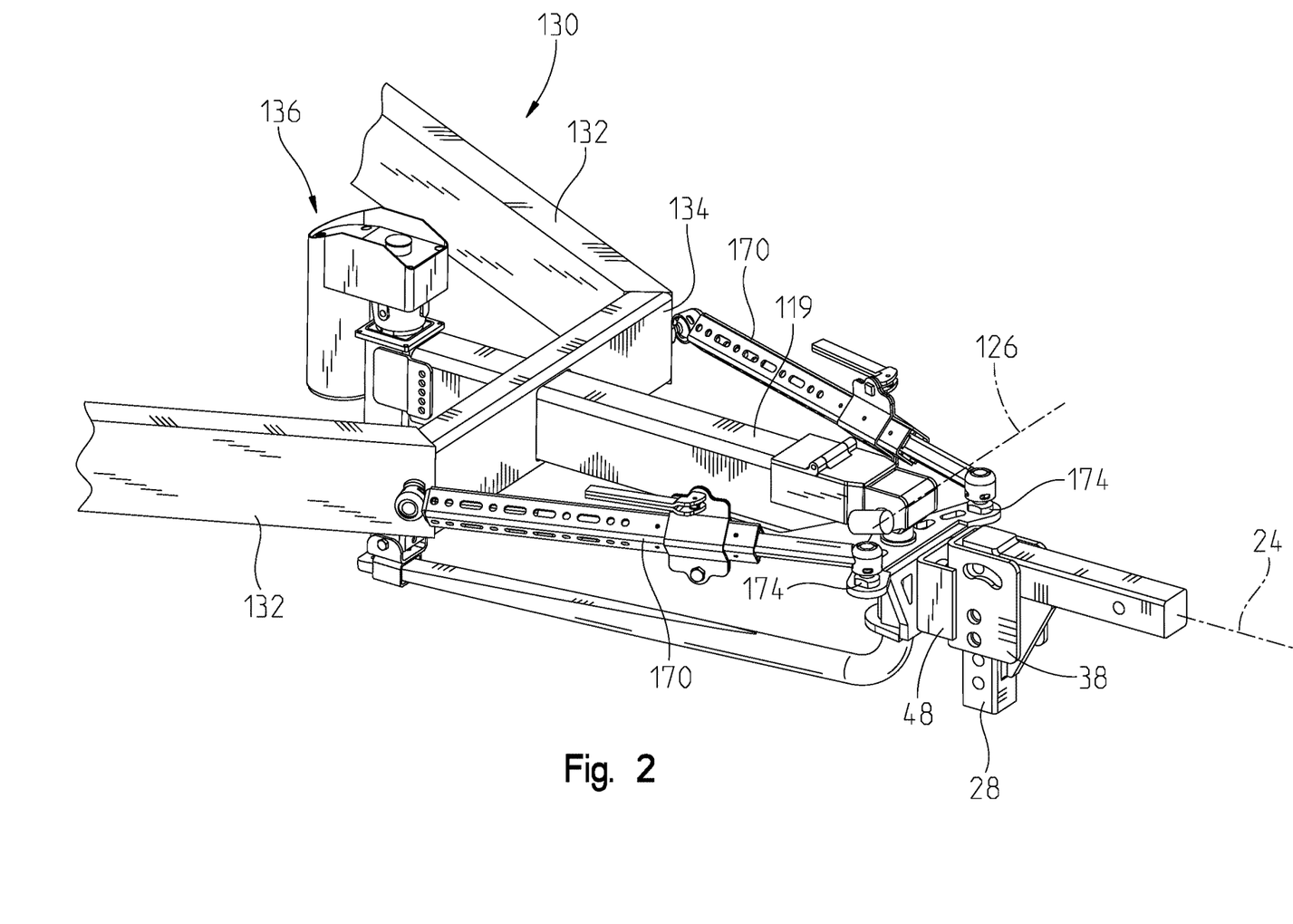
FIG. 2 is a perspective view of the system shown in FIG. 1.
Figure 3:
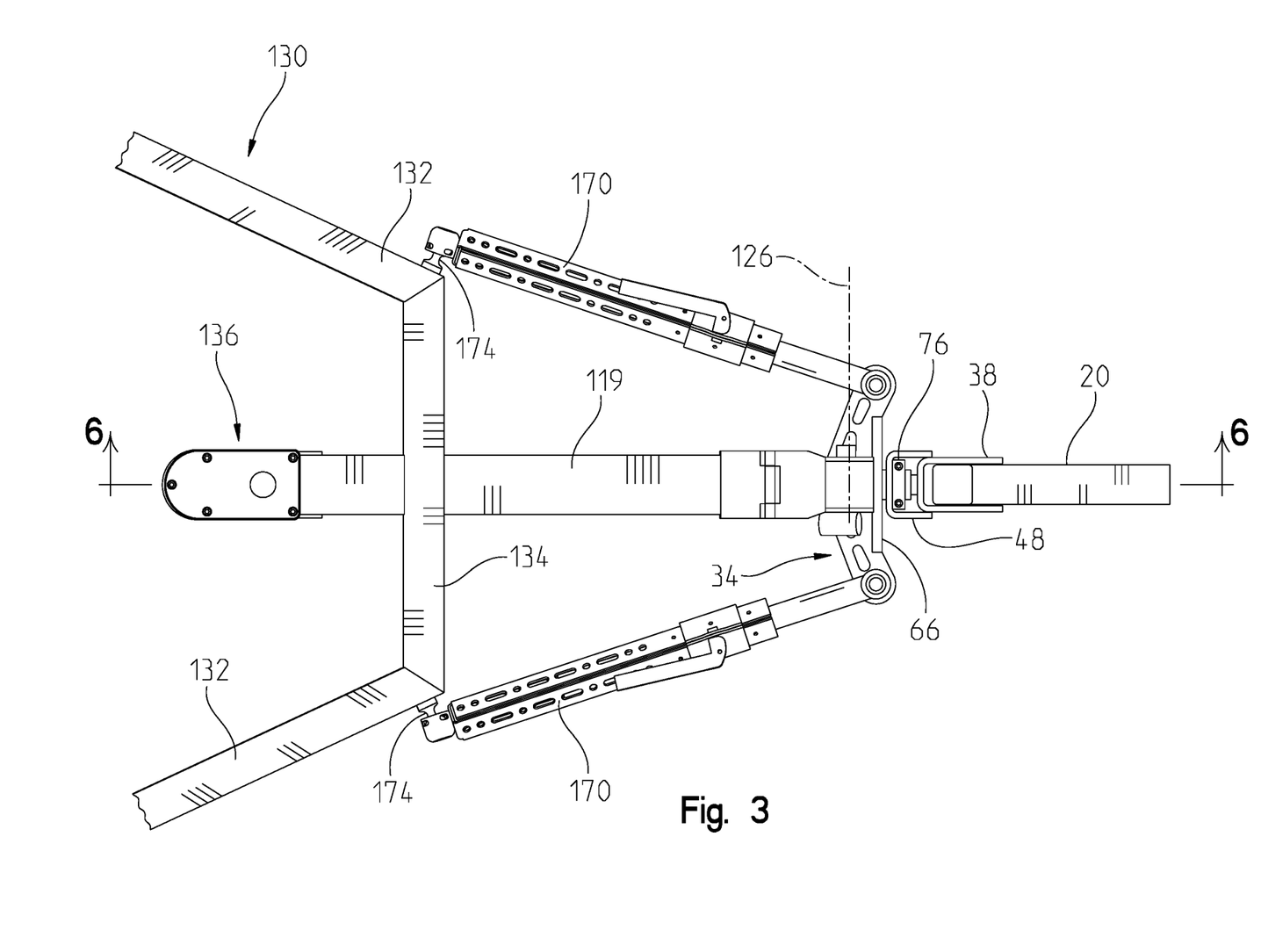
FIG. 3 is a top view of the system shown in FIGS. 1 and 2.
Figure 5:
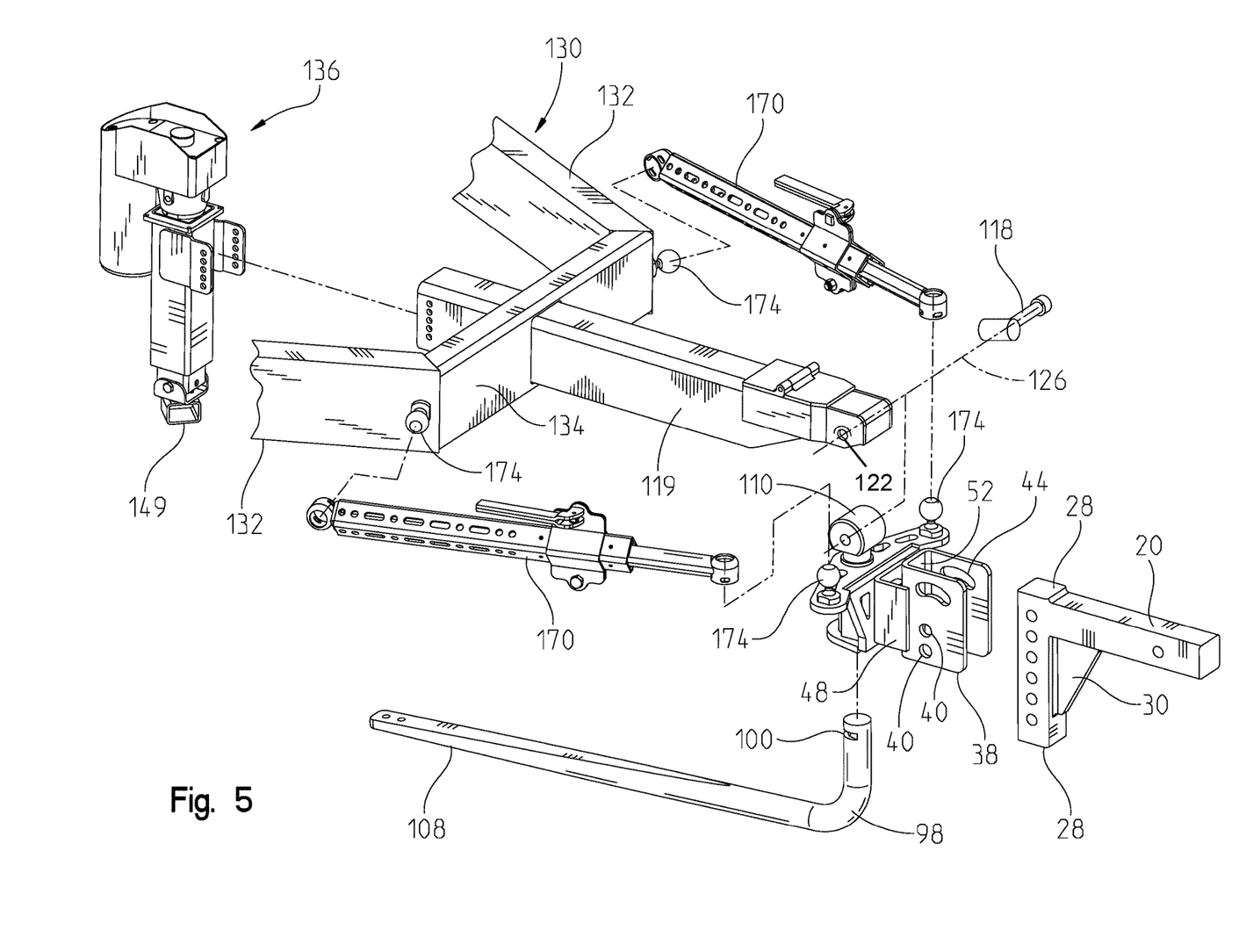
FIG. 5 is an exploded perspective view of the system in FIGS. 1-4.

FIG. 1 shows a side view of the force distributing system 10 connected between a trailer 14 and a towing vehicle 18. The force distributing system 10 includes a hitch bar 20 that is for fitting into a standard hitch receiver of the towing vehicle 18. The hitch bar 20 has a hitch bar axis 24 that corresponds with its center. The hitch bar 20 may be a solid bar or a tubular bar as is well known in the hitch industry. The hitch bar 20 has a vertical bar 28 that is welded to it and reinforced with a gusset 30. The vertical bar 28 has a plurality of holes 32 that are for receiving pins or bolts for mounting a hitch head 34 to the vertical bar 28. The bolts and pins are not shown for clarity. The hitch head 34 can be seen apart from the hitch bar 20 in FIG. 5. The hitch head 34 is pivotally connected to a mounting saddle 38 that straddles the vertical bar 28. Holes 40 in the mounting saddle 38 align with the holes 32 in the vertical bar 28 for selecting a desired height at which the entire hitch head 34 is mounted upon the vertical bar 28. The saddle 38 has an arcuate slots 44 that allows the saddle 38, and entire hitch head 34, to pivot with respect to the vertical bar 28 and hitch bar 20 when a bolt is installed through the slots 44 and holes 32 in the vertical tube. Like other types of hitches, tightening the bolt (not shown) in the slots 44 allows the hitch head 34 to be mounted at any desired angle with respect to the hitch bar 20 provided the desired angle is within the limits of the slots 44. The saddle 38 includes an offset bracket 48 that has an offset wall 50 that is spaced from a bridge wall 52 of the saddle 38. The offset bracket 48 is welded to the saddle 38.

The offset bracket 48 and saddle 38 are fixed with respect to the hitch bar 20 once bolts are tightened through the saddle 38 and vertical bar 28.

Figure 6A:
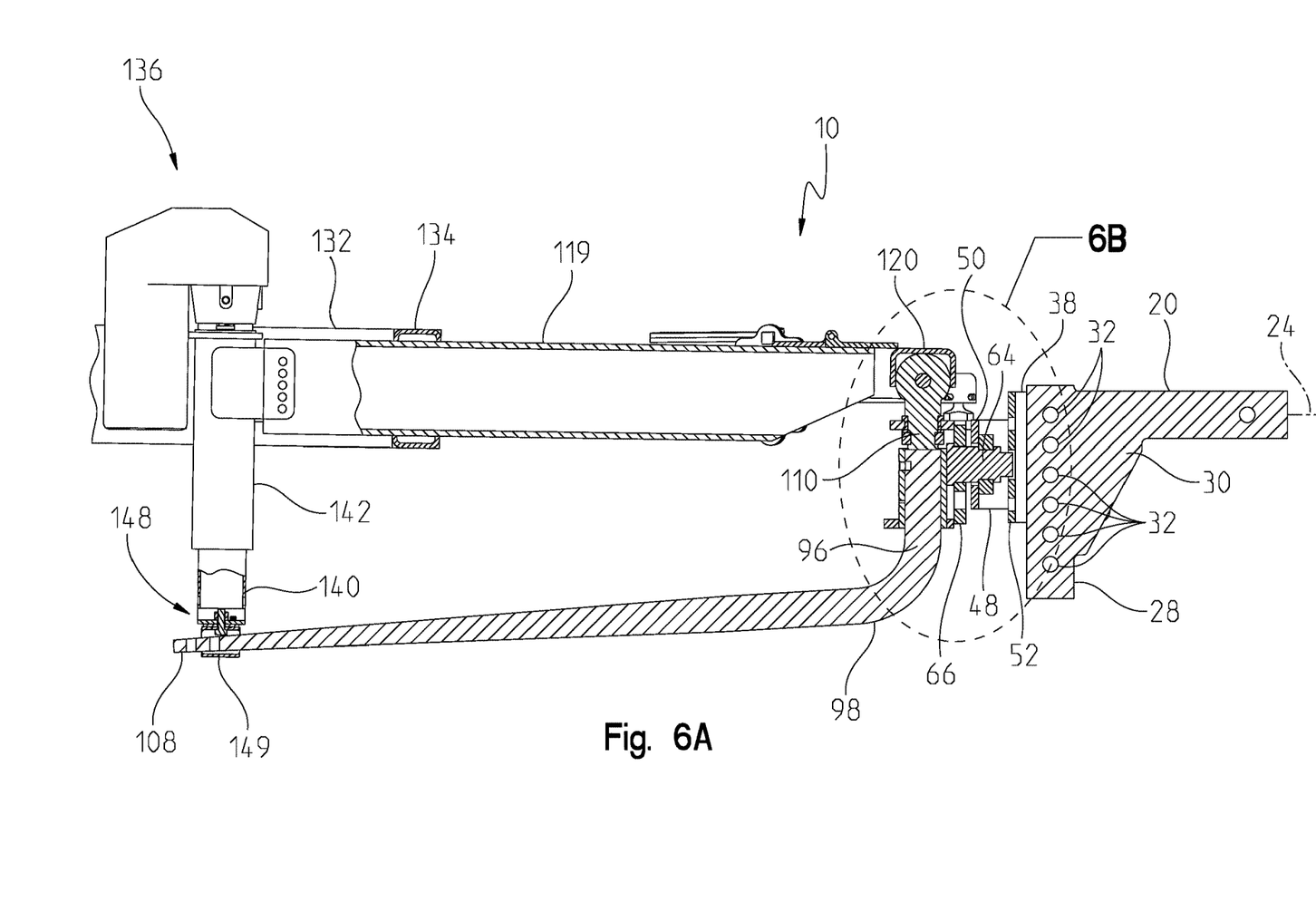
FIG. 6A is a sectional view of the system taken about line 6-6 in FIG. 3.
Figure 6B:
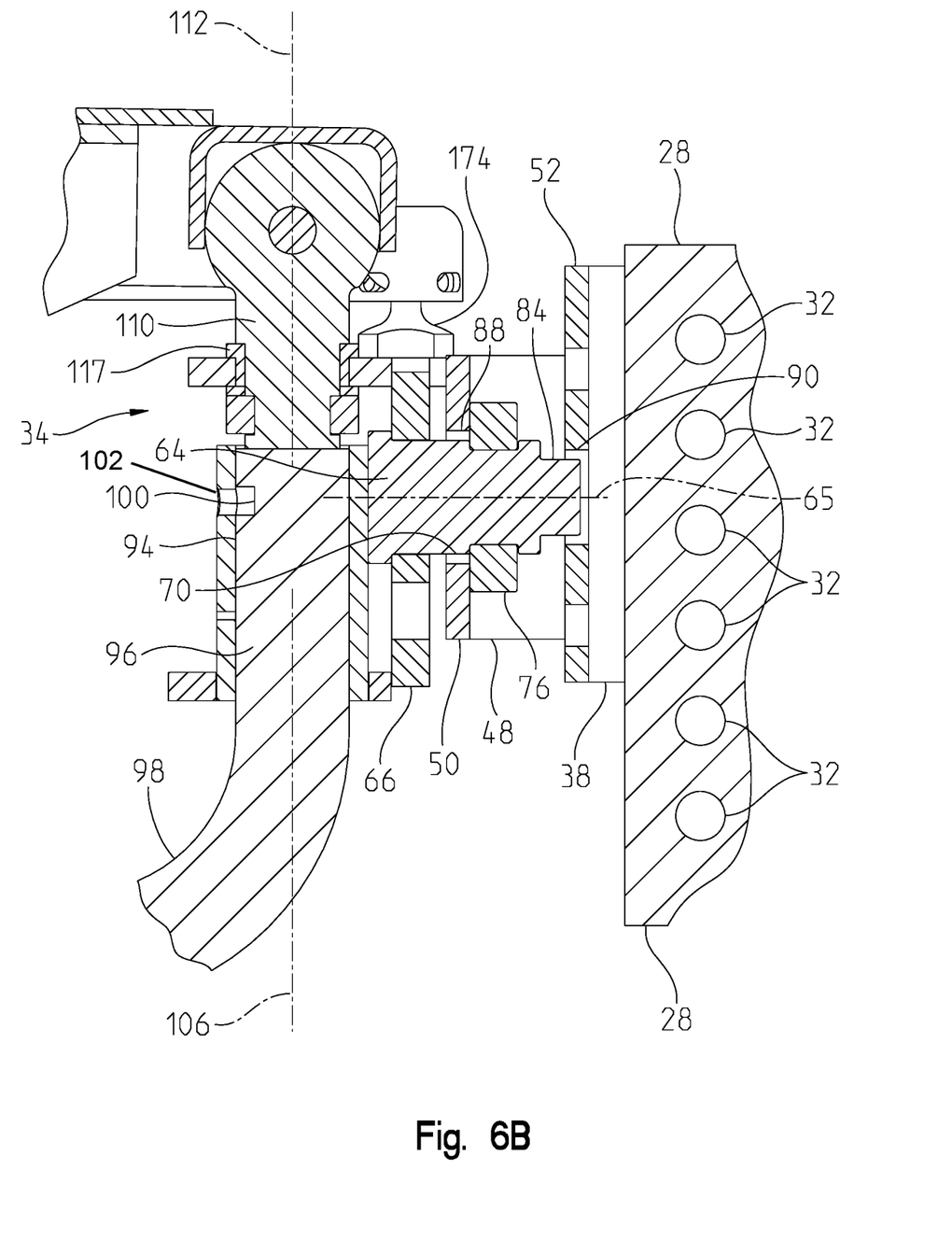
FIG. 6B is an enlarged sectional view taken about area 6B in FIG. 6A.
Figure 7:
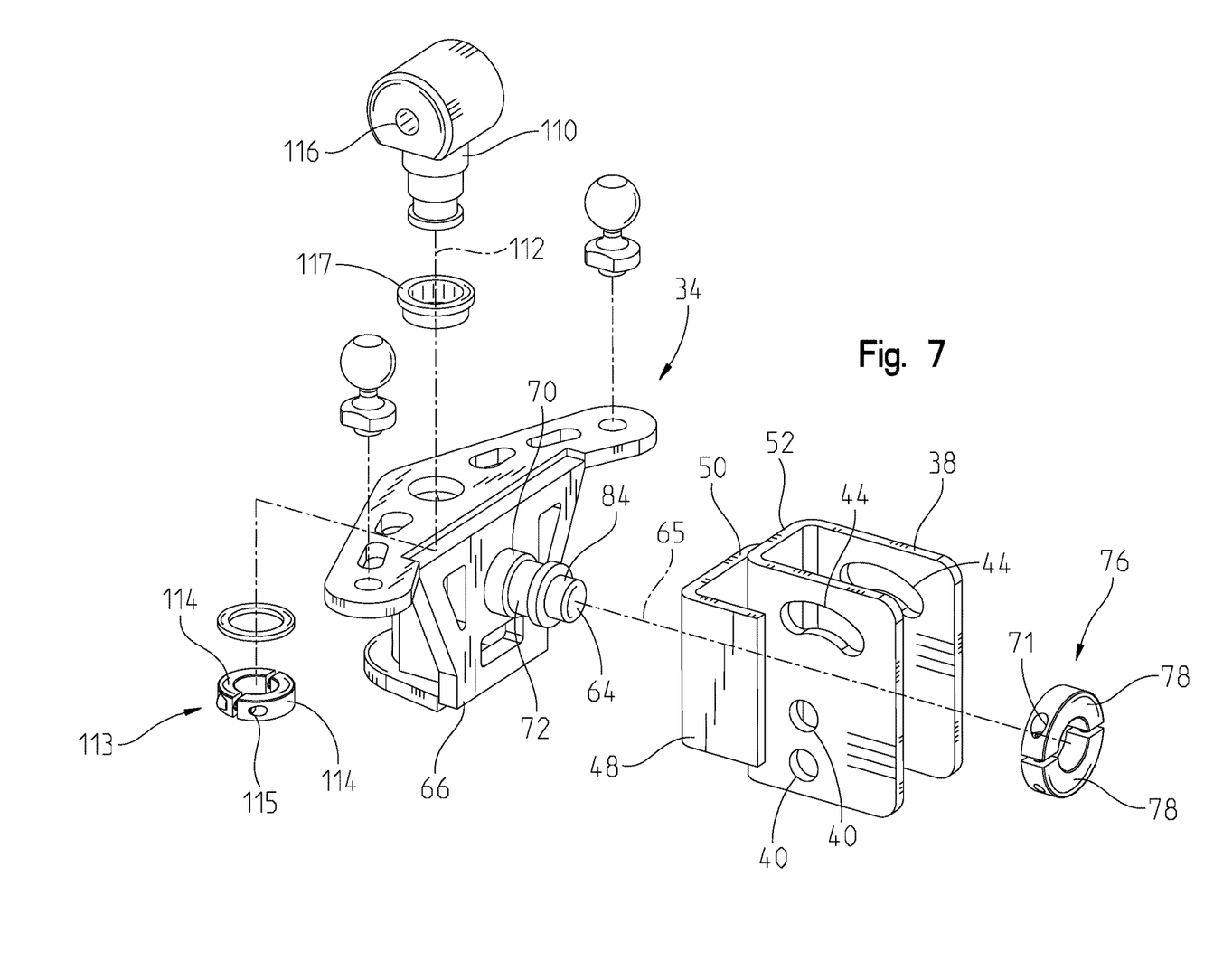
FIG. 7 is an exploded perspective view of the hitch head in FIGS. 1-6.

The hitch head 34 is pivotally connected to the offset bracket 48 by a pivot shaft 64 that is welded to the hitch head 34 at a front wall 66. FIG. 7 shows the pivot shaft 64 extending from the hitch head 34. The pivot shaft 64 has a first bearing diameter 70 that is nearest the front wall 66. The first bearing diameter 70 is adjacent to notch 72 that is for receiving a collar 76 that has halves 78 that are joined by screws 71. The pivot shaft 64 has a second bearing diameter 84 that is at a distal end of the pivot shaft 64 farthest from the front wall 66. The second bearing diameter 84, as shown in FIGS. 7 and 6B, is smaller than the first bearing diameter 70 but could be a size equal to the first bearing diameter 70. The pivot shaft 64 fits through an aperture 88 in the offset wall 50 of the offset bracket 48. The first bearing diameter 70 is contained within the aperture 88 and a bushing may be located within the aperture 88 to minimize friction. The collar 76 is located on the opposite side of the offset wall 50 as the front wall 66 of the hitch head 34. Thus, the offset wall 50 is straddled by the collar 76 and front wall 66 of the hitch head 34. As such, the hitch head 34, pivot shaft 64, and collar all rotate together about a hitch head axis 65. The hitch head axis is substantially parallel to the hitch bar axis 24 with the range of adjustment provided by the slots 44 that allow for slight changes in the hitch head 34 angle with respect to the hitch bar 20. The second bearing diameter 84 is received within an aperture 90 in the bridge wall 52 of the saddle 38. The second bearing diameter 84 is sized to be no larger than the first bearing diameter 70 so that the entire pivot shaft 64 fits into the aperture 88 in the offset wall 50. A bushing may be located within the aperture 90. In the configuration shown in FIG. 6B, the pivot shaft 64 is supported on two bearing locations spaced apart for strength in bending as weight is placed upon the hitch head 34.

The hitch head 34 contains a socket 94 for receiving the shaft 96 at a first end of a spring bar 98. The shaft 96 of the spring bar 98, has a notch 100 that is for receiving a spring pin (not shown) that is biased through an aperture 102 in the socket. The spring pin is used to hold the shaft 96 in the socket 94, and the notch 100 allows the spring bar 98 to pivot about a spring axis 106 that is centrally located with respect to the socket 94. The spring bar 98 has a distal end 108 that is cantilevered with respect to the shaft 96. As shown in FIGS., the spring bar 98 is a solid bar, however, it is contemplated that the spring bar 98 could be comprised of leaf type springs or other configurations that allow a biasing force to be exerted at the distal end 108. The spring bar 98 is the only spring bar 98 within the system 10, and this single spring bar 98 is located directly beneath the hitch head 34 when it is installed in the socket 94. The hitch head 34 also contains a hitch pin 110 that pivots within the hitch head 34 about a hitch pin axis 112. The hitch pin axis 112 is coaxial with the spring axis 106. The hitch pin 110 is affixed within the hitch head 34 much like the pivot shaft 64, and likewise, the hitch pin 110 has a collar 113 with halves 114 joined by screws 115 that fix the hitch pin 110 to the hitch head 34. A bushing 117 facilitates smooth rotation of the hitch pin 110 within the hitch head 34. The hitch pin 110 has an aperture 116 that extends through its upper end that is transverse to the hitch pin axis 112. The aperture 116 in the hitch pin 110 is for receiving a locking pin 118 to facilitate connection of the hitch pin 110 to trailer 14.

The trailer 14 has a tongue 119 that has a clevis 120 that acts as a coupler. The clevis 120 on the trailer has holes 122 on either side that align with the aperture 116 in the hitch pin 110. The trailer 14 is connected to the hitch pin 110 and retained thereto with the locking pin 118 that extends through the clevis 120 and the hitch pin 110. It is contemplated that the tongue 119 of the trailer 14 could contain a single through hole and a clevis could be affixed to the hitch pin 110, which is the opposite configuration as shown. The pin and clevis type connection that is made up of the clevis 120, hitch pin 110, and locking pin 118 facilitates pivotable movement of the trailer with respect to the hitch pin 110 about a locking pin axis 126 that is transverse to the hitch pin axis 112.

Figure 4:
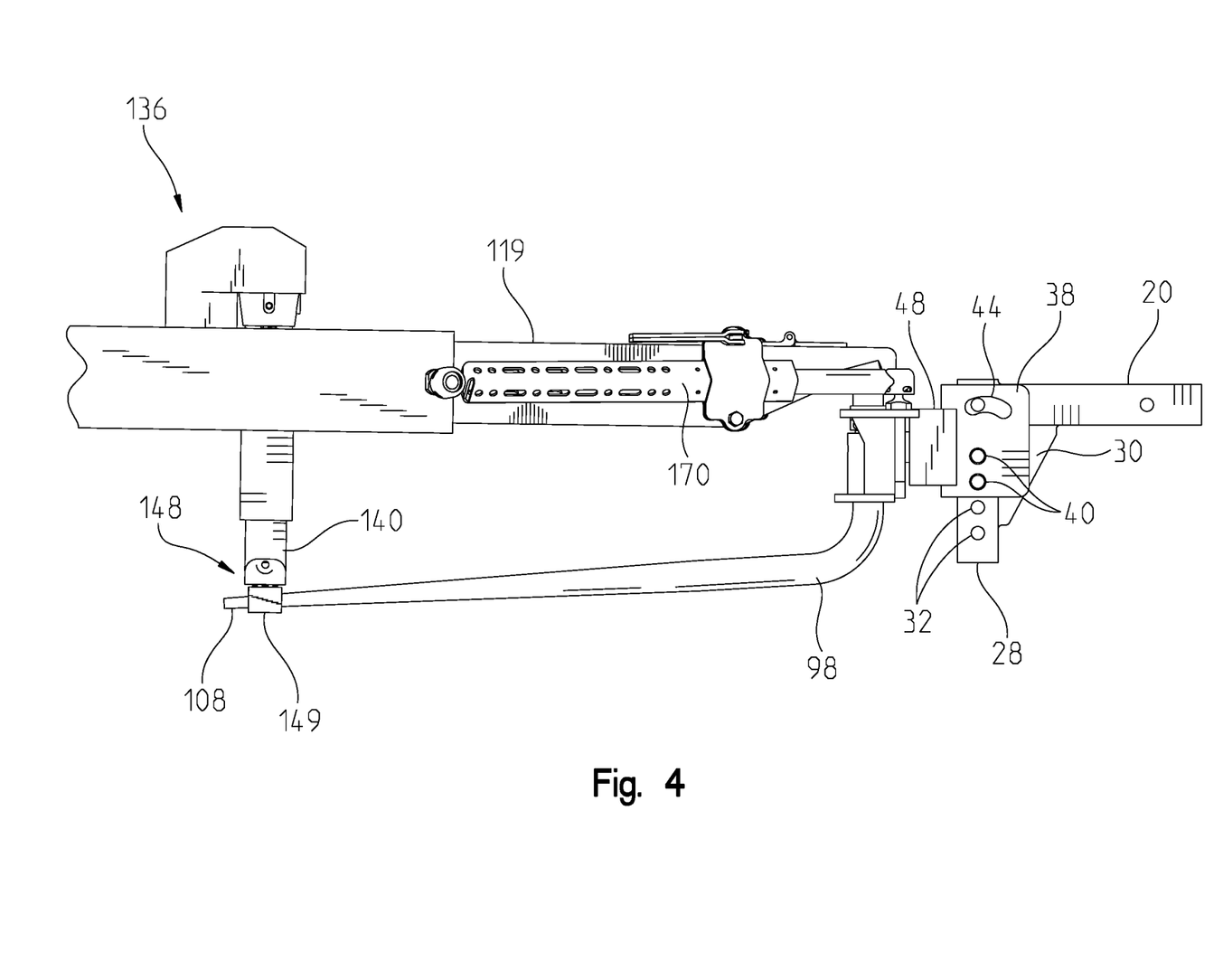
FIG. 4 is a side view of the system shown in FIGS. 1-3.

The trailer tongue 119 extends into a trailer frame 130 that has lateral members 132 that extend rearward toward the trailer in an A-frame configuration. The tongue 119 extends beyond a front frame member 134 to receive a jack 136 mounted thereto. The jack 136 is preferably an extremely low-profile jack that is disclosed in U.S. Pat. No. 8,894,038 because it provides much more room above the tongue 119 and frame 130 than a standard jack and that space that may be utilized for storage, or that space may be used for a more stylistic trailer that would never be possible without a low-profile jack 136. However, it is possible to embody the present invention with any jack having an extended and retracted position that may exert a force that pulls toward the trailer frame 130. The jack 136 includes a movable tube 140 that moves with respect to the jack body 142. As shown in FIG. 4, the jack body 142 includes the stationary tube indicated at 142 that remains fixed with respect to the trailer frame 130 and the term jack body 142 will generally be used to indicate the parts of the jack 136 that remain fixed with respect to the trailer 14.

Figure 8:
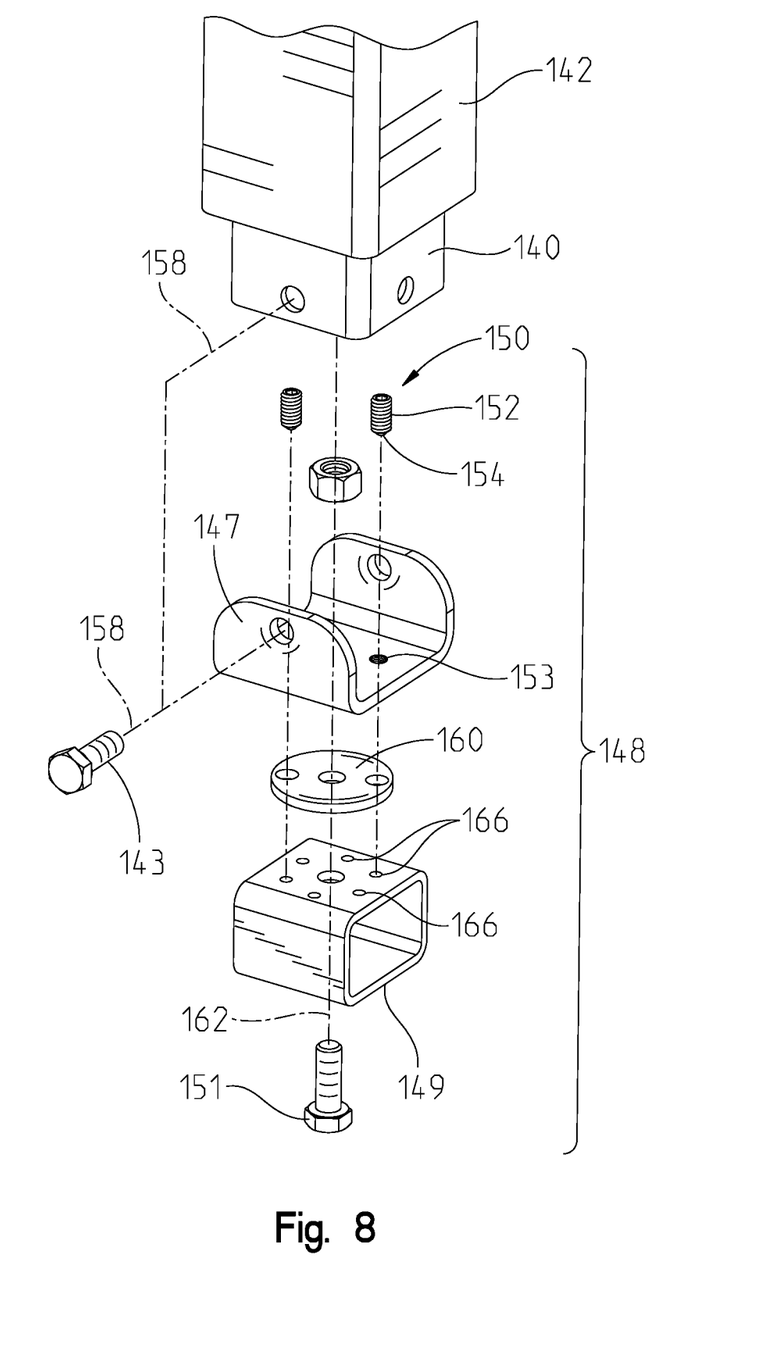
FIG. 8 is an exploded view of the connector pivotally affixed to the jack on the trailer used in the system shown in FIGS. 1-7.

The movable jack movable tube 140 includes a spring retainer 148. The spring retainer 148 has a saddle 147 that is pivotally held to the jack movable tube 140 with a bolt 143 that allows the spring retainer 148 to pivot with respect to the jack movable tube 140 about an axis 158 through the center of the bolt 143, and that axis 158 is substantially perpendicular to the jack movable tube 140. The spring retainer 148 has a spring box 149 that pivots about a bolt 151 that extends through the saddle 147 to mount the spring box 149 to the movable saddle 147. The saddle 147 includes two tapped holes 153 that house a pair of spring ball mechanisms 150. The spring ball mechanisms 150 each include a set screw 152 that acts as a containing body for a ball 154 extending from the lower end that is biased outwardly from the end with an internal spring inside the set screw 152. A low friction washer 160 is located between the saddle 147 and spring box 149 to facilitate smooth rotation of the spring box 149 about axis 162 that corresponds to the center of bolt 151. The ball 154 at the end of each spring ball mechanism 150 mates with a detent 166 in the top of the spring box 149. The balls 154 being biased into the detents 166 provide affirmative stops at desired locations as the spring box 149 is rotated. The spring box 149 is a rectangular tube and provides for easy insertion of the distal end 108 of the spring bar 98.

Use of the force distributing system 10 of the present invention is much like the use of traditional hitches and the force distributing system 10 distributes the force from the tongue weight more evenly across the wheels of the towing vehicle 18. A user of the system 10 will first attach the clevis 120 on the trailer 14 to the hitch pin 110 that extends upwardly from the hitch head 34. Once the clevis 120 has its holes 122 aligned with the aperture 116 in the hitch pin 110, the locking pin 118 is installed through the holes 122 and aperture 116 to lock the trailer 14 onto the hitch pin 110. The user can rotate the spring box 149 into a convenient position so that he can insert the distal end 108 of the spring bar 98 into the spring box 149. This is done when the spring box 149 is rotated at an angle that locates the shaft 96 of the spring bar 98 away from the socket 94 in the hitch head 34. Once the distal end 108 of the spring bar 98 is inserted into the spring box 149, the shaft 96 of the spring bar is rotated toward the socket 94 and the shaft 96 is inserted into the socket 94 until the spring pin catches the notch 100, thereby retaining the spring bar 98 in the socket 94 and in the spring box 149 on the jack. This is shown in FIG. 6. Inserting the spring bar 98 into the jack 136 is possible when the jack 136 is in its extended position and this corresponds to the movable tube 140 extended relative to the jack body 142. This extended position locates the spring box 149 at a relatively far distance from the tongue 119 and when the distal end 108 of the spring bar 98 is in the spring box 149, the distal end 108 of the spring bar 98 is also relatively far from the tongue 119. In the extended position, the spring bar 98 will not exert any force upon the trailer 14 or towing vehicle 18. Once the spring bar 98 is mounted to the jack 136 and socket 94 in the hitch head 34, the jack 136 can be retracted. In the retracted position, the spring box 149 is located relatively near the tongue 119 and the spring bar 98 exerts a basing force that tends to bias the distal end 108 spring bar 98 against the spring box 149. The biasing force generated by the spring bar 98 in the retracted position distributes the force from the tongue weight more evenly across the wheels of the vehicle.

The use of the system 10 of this invention still allows for traditional features that users are accustomed to using and provides distinct advantages over traditional weight distributing hitch systems. Sway bars 170 may still be connected to mounting balls 174 that are located on the hitch head 34 and frame 130 of the trailer 14. Use of the system 10 is simpler for the user because, unlike previous systems, there are no longer separate spring bars located on the outsides of the frame 130. The single spring bar 98 is located completely underneath the tongue 119 and a user runs no risk of bumping into the single spring bar 98. Due to the fact the spring bar 98 is constrained between both ends within the spring box 149 and socket 94 of the head 34, there is no chance the spring bar 98 may loosen from chains, brackets, or other hardware and strike the user. A user is not required to muscle the spring bar 98 into place because the jack 136 does the work of drawing the distal end 108 of the spring bar 98 nearer the trailer 14 to provide the biasing force. As the towing vehicle 18 travels, it may roll with respect to the trailer 14. In such rolling motion, the pivot shaft 64 will move with the head 34. During that motion, the spring bar 98 will maintain its position with respect to the trailer 14. In other words, the distal end 108 of the spring bar 98 will remain at the same distance from the tongue 119 and provide a constant biasing force. This will maintain the same force on the trailer 14. The single spring bar 98 will not impart varying stresses on the trailer 14 when the vehicle rolls as is the case with two separate spring bars that have been traditionally used.

The invention is not limited to the details above, but may be modified within the scope of the following claims.

What is claimed is:

1. A system for distributing force of a trailer to a vehicle comprising:
    a hitch bar for mounting to said vehicle, said hitch bar having a hitch bar axis;
    a hitch head pivotally connected to said hitch bar being pivotal about a hitch head axis that is substantially parallel to said hitch bar axis;
    a hitch pin rotatably fixed to said hitch head and rotatable with respect to said hitch head about a hitch pin axis that is transverse to said hitch head axis and intersects said hitch head axis, said hitch pin having an aperture extending therethrough transverse to said hitch pin axis;
    only one spring having a first end including a shaft and a second end for connecting to said trailer, said shaft extending into a socket within said hitch head and said only one spring pivotable about said shaft, wherein said only one spring pivots about an axis coaxial with said hitch pin axis.

2. The system of claim 1, wherein said hitch pin is adapted for being received in a clevis of said trailer and said hitch pin is adapted for receiving a locking pin through said aperture of said hitch pin for securing said trailer to said hitch pin.

3. The system of claim 1, wherein said second end of said only one spring is selectively connectable to a jack that is for being fixed with respect to said trailer and spaced rearward from said hitch pin when said trailer is connected to said hitch pin, said jack being movable between an extended position and a retracted position, said jack being connectable with said only one spring so that when said jack is moved toward said retracted position said only one spring generates a biasing force against said jack.

4. The system of claim 3, wherein said jack includes a spring box for receiving said second end of said only one spring.

5. A system for distributing force of a trailer to a vehicle comprising:
    a hitch bar for mounting to said vehicle;
    a hitch head pivotally connected to said hitch bar being pivotal about a hitch head axis;
    a hitch pin rotatably fixed to said hitch head and rotatable with respect to said hitch head about a hitch pin axis that is transverse to said hitch head axis;
    only one spring pivotally connected to said hitch head near a first end of said only one spring and said only one spring being pivotable with respect to said hitch head about a spring axis that is coaxial with said hitch pin axis, said only one spring being connectable to said trailer near a second end of said only one spring when said trailer is connected to said hitch pin and said only one spring for providing a biasing force when moved from a first position relative to said trailer into a second position nearer to said trailer.

6. The system of claim 5, wherein said hitch pin is adapted for being received by said trailer and being connected so that said trailer may pivot with respect to said hitch pin about an axis that is transverse to said hitch pin axis.

7. The system of claim 6, wherein said hitch pin is connectable to said trailer by a pin and clevis connection.

8. The system of claim 5, wherein said hitch pin includes an aperture extending therethrough transverse to said hitch pin axis.

9. The system of claim 8, wherein said hitch pin is adapted for being received in a clevis of said trailer and said hitch pin is adapted for receiving a locking pin through said aperture of said hitch pin for securing said trailer to said hitch pin.

10. The system of claim 5, wherein a jack fixed with respect to said trailer includes a spring box for receiving said second end of said only one spring.

11. A system for distributing force of a trailer to a vehicle, the trailer including a tongue and a clevis at a distal end of the tongue, the system comprising:

a hitch head pivotally connected to a hitch bar and being pivotal about a hitch head axis and configured to be engaged by the clevis;

a hitch pin rotatably fixed to said hitch head and rotatable with respect to said hitch head about a hitch pin axis that is transverse to said hitch head axis;

only one spring pivotally connected to said hitch head and pivotable with respect to said hitch head about a spring axis, said only one spring being connectable to said trailer when said trailer is connected to said hitch pin and said only one spring configured for providing a biasing force when a distal end of said only one spring spaced from said spring axis is moved from a first position relative to said trailer into a second position nearer to said trailer, wherein said only one spring is vertically aligned with the tongue of the trailer.

12. The system of claim 11, wherein said spring axis is coaxial with said hitch pin axis.

13. The system of claim 12, wherein said hitch pin is adapted for being received by said trailer and being connected so that said trailer may pivot with respect to said hitch pin about an axis that is transverse to said hitch pin axis.

14. The system of claim 13, wherein said hitch pin is adapted for being received in the clevis of said trailer and said hitch pin includes an aperture adapted for receiving a locking pin through said aperture of said hitch pin for securing said trailer to said hitch pin.

15. The system of claim 11, wherein a jack includes a spring box for receiving said distal end of said only one spring.

\* \* \* \* \*